Sept. 13, 1960   H. E. SIMONSON ET AL   2,952,151
SAFETY DEVICE FOR USE IN TESTING RELIEF
VALVES ON PRESSURIZED FLUID CONTAINERS
Filed May 16, 1955
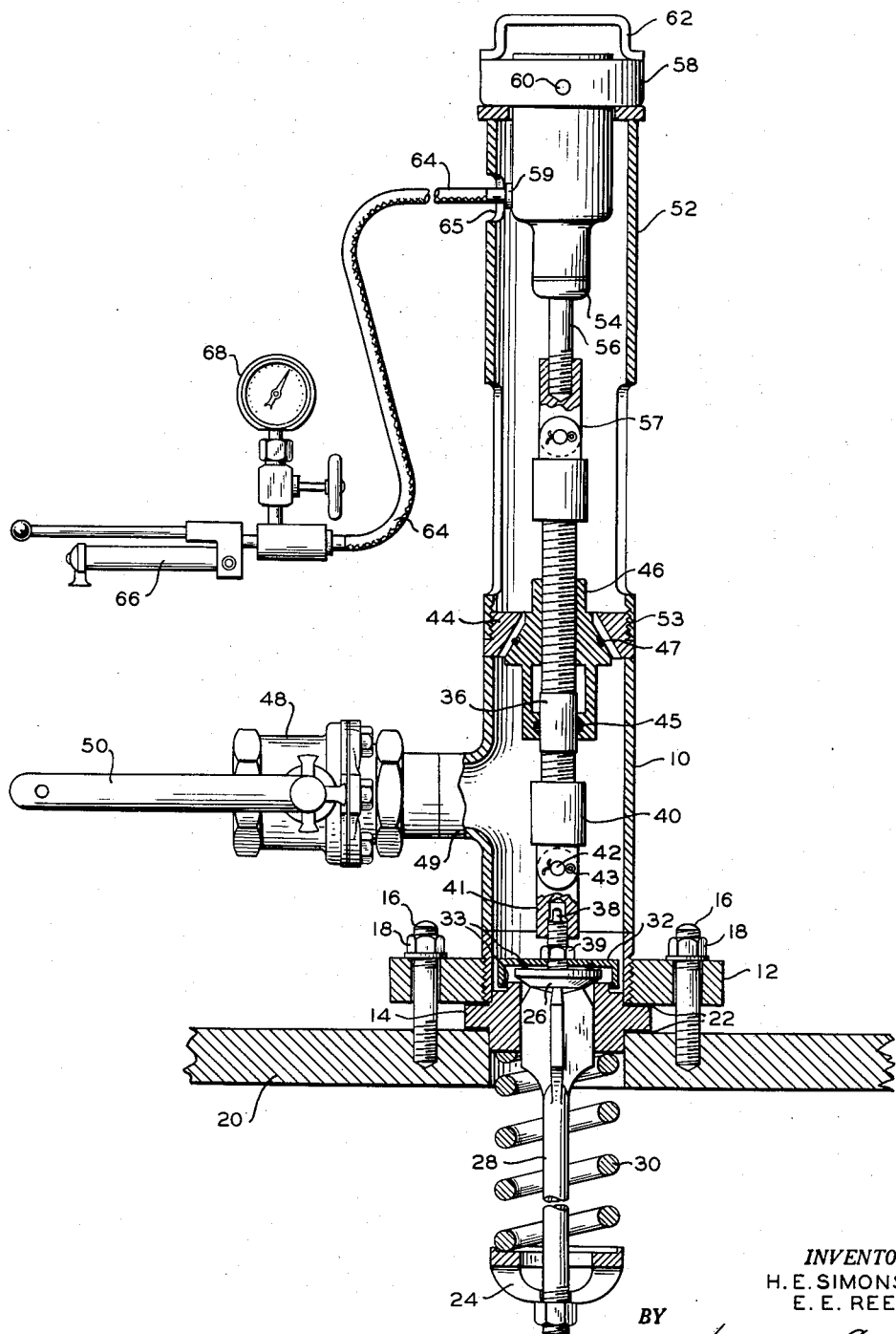
INVENTORS
H. E. SIMONSON
E. E. REED
BY
Hudson & Young
ATTORNEYS

__UNITED STATES PATENT OFFICE__

2,952,151
Patented Sept. 13, 1960

2,952,151

SAFETY DEVICE FOR USE IN TESTING RELIEF VALVES ON PRESSURIZED FLUID CONTAINERS

Howard E. Simonson and Edwin E. Reed, Bartlesville, Okla., assignors to Phillips Petroleum Company, a corporation of Delaware Filed May 16, 1955, Ser. No. 508,396

9 Claims. (Cl. 73—4)

This invention relates to a safety device for testing relief valves on containers filled with fluid under pressure.

In the art of distributing fluids under pressure in cylinders and storage tanks, it is very important to provide these vessels with a pressure relief valve that will be sure to open if a safe pressure is exceeded by the fluid inside the vessel. Even a single accident caused by the rupturing of a container in the distribution or use by the consumer of domestic cooking gas or industrial fuel gas, or other gases in pressurized containers might very well result in considerable damage to equipment and injury to personnel. A test of the safety valve at reasonable time intervals is good practice. A device for testing spring-operated safety valves is fully described in U.S. Patent 2,419,293, issued to H. E. Simonson, April 22, 1947.

In the operation of such a testing device as that shown in the aforesaid patent, should the spring on the relief valve break or the valve otherwise fail to seal the relief port, complete loss of product would result with attendant hazards from possible fires, explosions, toxicity, etc. The present invention provides a safety device which forms a sealed enclosure around the relief valve port in the event the valve fails to function during or at the end of the testing procedure, thereby preventing loss of the contents of the tank or container in which the valve is positioned and avoiding the hazards accompanying such loss.

The principal object of the invention is to provide a safety device for testing relief valves on fluid pressurized containers such as storage and dispensing tanks and cylinders. Another object is to prevent loss of stored fluid when testing a relief valve on a storage vessel under fluid pressure. A further object is to provide a hydraulic valve testing means for a pressure relief valve which prevents loss of pressurized stored fluid and attendant hazards in the event of valve failure during testing. Other objects of the invention will become apparent upon consideration of the accompanying disclosure.

The device of the invention comprises a housing enclosing the attaching end of a valve actuating rod adapted to pull the relief valve head off its seat, the housing having means on one end for sealing attachment to an element of the valve body or surrounding tank structure, an inwardly-facing valve seat in the opposite end of the housing, and an outwardly-facing valve head on the actuating rod spaced a short distance from the seat. The actuating rod attaches to the relief valve head by any suitable means and the opposite end is adapted to connect with any suitable operating means such as a lever or hydraulic cylinder. Upon axial movement of the actuating rod in lifting the relief valve head from its seat so as to test the pull required to operate the same against the compression of its spring, gas escapes from the tank or cylinder in which the relief valve is positioned into the housing enclosing the actuating rod and is vented to the atmosphere through a valve in the side of the housing. In the event of failure of the relief valve for any reason, such as spring or stem breakage, the valve head in the housing is forced against the seal in the end of the housing and prevents escape of gas through the valve port. When this occurs, the auxiliary valve in the side of the housing is manually closed by the operator so as to seal the housing to prevent escape of gas therefrom.

More complete understanding of the invention may be had by reference to the schematic drawing which is an elevation, partially in section, of a preferred embodiment of the device of the invention.

A housing 10 is threaded into a relief valve flange 12 which clamps a relief valve body 14 by means of bolts 16 and nuts 18 to a manhole cover plate or tank shell 20. Gaskets 22 provide a seal between relief valve body 14 and the adjacent members. A relief valve assembly 24 comprising valve head 26, valve stem 28, and compression spring 30 is operatively associated with relief valve body 14 as shown. A sealing cap 32 provided with sealing rings 33 forms an additional seal around the valve head 26.

The device for lifting valve head 26 off its seat for testing the tension and function of valve spring 30 comprises an actuating rod 36 positioned axially in housing 10 and coupled to a connecting rod 38 threaded through cap 32 and into valve head 26. A nut 39 locks threaded coupler 38 to the valve cap 32 and valve head 26. Actuating rod 36 is connected with coupler 38 by means of a clevis joint comprising male and female elements 40 and 41, respectively, attached by pin 42 which is secured by cotter key 43. A valve body 44 is provided in the outer end of housing 10 and provides an inwardly-facing valve seat for a valve head 46 which is threaded onto rod 36 and sealed therewith by means of sealing ring 45. Another sealing ring 47 on the face of valve head 46 engages the seat of valve body 44 and forms a seal therewith. This arrangement provides flexibility and adjustability for testing relief valves of varying design and arrangement with the storage vessel and permits regulation of the space between the valve head 46 and its seat in valve body 44.

An auxiliary valve 48 is positioned in a conduit 49 opening into the side of housing 10. This valve is normally open and is closed by lever 50 when valve assembly 24 fails to function properly during the testing procedure. A second housing 52 is attached to the periphery of valve body 44 or to the outer end of housing 10 by any suitable means, such as threads 53, and encloses and supports a hydraulic cylinder 54 as the operating means for actuating rod 36. The connecting rod 56 of cylinder 54 is coupled to the end of actuating rod 36 by means of a clevis coupling arrangement 57 which is similar to that used in coupling the opposite end of rod 36 with valve coupling member 38. Hydraulic cylinder 54 is supported in housing 52 by means of bracket 58. An inlet connection 59 permits flow of fluid to cylinder 54 and an outlet connection 60 allows venting of fluid therefrom. A handle 62 is attached to the end of the hydraulic cylinder assembly and directly to bracket 58 to provide ease of handling.

Compression fluid for operating cylinder 54 is supplied by means of a flexible line 64 which passes through opening 65 in housing 52 and connects directly with cylinder 54. The opposite end of the tubing is connected with a hydraulic pump 66 which supplies a suitable fluid, such as oil, for operation of the cylinder and actuation of rod 36 in lifting valve head 26 off its seat. A pressure gauge 68 in tubing 64 provides an indication of pressure applied to the actuating cylinder which is used in conventional manner in determining the pressure required to lift valve head 26.

In testing valve assembly 24, fluid is pumped into cylinder 54 until movement of actuating rod 36 in a direction away from the relief valve head compresses spring 30 so as to permit unseating of the valve head and escape of pressured fluid from within the tank or vessel in which the pressured fluid is stored. The safety device of the invention stands ready to function during testing and does so, in the event spring 30 breaks or valve head 26 fails to properly seat for any other reason, by automatic closure of valve head 46 against the valve seat in valve body 44. The operator then can pull lever 50 so as to close valve 48 and cut off the escape of compressed fluid from the housing and the storage vessel with which it is connected. The safety device of the invention also functions to prevent over-compression of spring 30 during testing so as to lessen the danger of spring breakage. Valve head 46 is conveniently positioned on actuating rod 40 to provide only a short distance or space between valve body 44 and valve head 46 so that, as actuating rod 36 moves upwardly and pulls valve head 26 off its seat, the travel of the valve head and the amount of spring compression are limited by the limited movement of valve head 46. The threaded engagement between valve head 46 and actuating rod 36 renders the adjustment of the space between the valve head and seat in valve body 44 very simple.

The flexible and adjustable character of the actuating rod and coupling means as well as the adjustable character of the valve head in relation to its valve seat is not an essential part of the device of the invention, it being feasible to utilize a solid rod which attaches to or screws directly into the relief valve head and makes a coupling or connection with the operating means, such as hydraulic cylinder 54. It is also feasible to utilize other connecting means for actuating rod 36 than that shown in the drawing, e.g., the coupling means shown in the above-identified Patent, 2,419,293, including a hook and pull-ring assembly. It is also within the scope of the invention to utilize any suitable operating means in the operation or movement of actuating rod 36 in pulling valve head 26.

Certain modifications of the invention will become apparent to those skilled in the art and the illustrative details disclosed are not to be construed as imposing unnecessary limitations on the invention.

We claim:

1. A safety device for testing a relief valve on a fluid-containing vessel comprising a housing adapted to form a sealed attachment around a relief valve; a coupling rod extending through said housing from the attaching end thereof having means adjacent said end for attaching to the head of said relief valve; means in the end of said housing opposite the attaching end for sealing said housing with said coupling rod comprising an inwardly facing valve seat in the opposite end of said housing surrounding said rod and a valve head on said rod inside said housing adapted to seat in said valve seat on axial movement of said rod away from said relief valve; and a valve in the side of said housing for controlling fluid flow therefrom.

2. The device of claim 1 wherein the attaching end of said housing is threaded for attachment with a threaded member around said relief valve.

3. The device of claim 1 wherein said rod is threaded through the valve head thereon so as to provide for adjustment of the space between said valve head and its seat.

4. The device of claim 1 wherein the attaching means on the end of said rod comprises a threaded member adapted to attach to a threaded member on the head of said relief valve.

5. The device of claim 1 including actuating means connected with the end of said rod opposite the attaching end.

6. The device of claim 5 wherein said actuating means comprises a fluid operated cylinder having its connecting rod attached to the end of said rod.

7. A safety device for testing a relief valve comprising a coupling rod adapted to attach at one end to a valve head to be moved; a housing around a substantial section of said rod including the attaching end of said rod; means on said housing adjacent the attaching end of said rod for making a sealed attachment with a relief valve body; an inwardly facing valve seat in the end of said housing opposite the attaching end; a valve head on said rod adapted to seat in said valve seat when said rod is moved axially away from said relief valve so as to limit the travel of said rod and seal off escape of fluid from said housing in the event said relief valve fails during testing; and an auxiliary valve in said first housing for venting fluid while testing said relief valve and shutting off flow when said relief valve fails.

8. A safety device for testing a relief valve on a vessel containing a fluid under pressure comprising a generally cylindrical first housing threaded at one end for sealing attachment to a threaded member on said vessel surrounding a relief valve therein; an actuating rod extending axially through said first housing; coupling means on said rod adjacent the attaching end of said first housing for coupling with a relief valve head; an inwardly-facing valve seat in the opposite end of said first housing from the attaching end, said seat surrounding said rod; an outwardly-facing valve head on said rod inside said first housing spaced from said seat so as to seal off said first housing when said rod is actuated so as to lift said relief valve; coupling means on the opposite end of said rod outside of said first housing for attaching to actuating means; a second housing coaxial with first said housing supported on the end thereof opposite the attaching end; a fluid operated cylinder in said second housing having its connecting rod coupled with last said coupling means; and an auxiliary valve in said first housing for venting fluid while testing said relief valve and shutting off flow when said relief valve fails.

9. The device of claim 8 including fluid supply means for actuating said cylinder having pressure sensitive means for indicating the fluid pressure used in lifting said relief valve.

References Cited in the file of this patent

UNITED STATES PATENTS

| | | |
|---|---|---|
| 1,144,758 | Desmond | June 29, 1915 |
| 1,172,833 | Ricker | Feb. 22, 1916 |
| 1,637,743 | Fine | Aug. 2, 1927 |
| 2,129,763 | Hart | Sept. 13, 1938 |
| 2,178,901 | Webster | Nov. 7, 1939 |
| 2,419,293 | Simonson | Apr. 22, 1947 |
| 2,637,197 | Kaney | May 5, 1953 |